United States Patent Office 3,251,760
Patented May 17, 1966

3,251,760
PROCESS FOR THE PRODUCTION OF ORGANIC COMPOUNDS CONTAINING NITROGEN AND CHLORINE COMBINED IN AN —N=CCl— RADICAL
Hans Holtschmidt and Wilfried Zecher, Cologne-Stammheim, Germany, assignors to Farbenfabriken Bayer Aktiengesellschaft, Leverkusen, Germany, a German corporation
No Drawing. Filed Aug. 28, 1962, Ser. No. 220,070
Claims priority, application Germany, Sept. 13, 1961, F 34,920; Nov. 9, 1961, F 35,319
8 Claims. (Cl. 204—158)

The present invention relates to a process for the production of organic compounds which contain nitrogen and chlorine combined in an —N=CCl— radical, some of which are new compounds.

Our copending patent application Serial No. 220,054, filed August 28, 1962, includes a description of a process for the production of organic nitrogen compounds which contain the —N=CCl— radical which comprises (1) reacting a compound having the formula

in which $R_1$ and $R_2$ separately stand for an alkyl or aryl group which may be substituted by halogen, cyano, aryl, alkyl, amino or imino groups, and in which $R_1$ and $R_2$ together with =N— jointly stand for an isocyclic or heterocyclic ring, and in which X stands for an acyl group, with chlorine at temperatures below 140° C. to the extent that all replaceable hydrogen atoms are replaced chlorine atoms, and then (2) treating the chlorination product thus obtained with chlorine at temperatures between 140° C. and 300° C., whereby an acyl chloride is split off.

It has been found that organic nitrogen compounds which contain the —N=CCl— radical can be obtained by first of all reacting an amine having the formula

in which $R_1$ and $R_2$ separately stand for an alkyl or aryl group which may be substituted by halogen, cyano, aryl, alkyl, amino or imino groups, and in which $R_1$ and $R_2$ together with =N— jointly stand for an isocyclic or heterocyclic ring, and in which $R_3$ stands for a methyl or an aryl group which can be further substituted, with chlorine at temperatures below 140° C. to the extent that all replaceable hydrogen atoms are replaced by chlorine atoms, and then treating the chlorination product thus obtained with chlorine at temperatures between 140° C. and 300° C., whereby an alkyl chloride is split off.

It is important to conduct the reaction with the temperature so controlled that the amino compounds are so completely saturated with chlorine at temperatures below 140° C. that in the subsequent chlorinating dissociation, which takes place between 140 and 300° C., condensation and polymerization reactions are prevented. Furthermore, when chlorine is introduced at lower temperatures carbon atoms which are in the alpha position with reference to nitrogen acquire a positive charge which favors subsequent dissociation rather than any side reaction.

The amines mentioned are, in general, such strong bases that their hydrochlorides precipitate at the beginning of chlorination. Therefore hydrochlorides or alkylation products (with alkyl halogenide) of these amines may be introduced from the very beginning. As chlorination proceeds the basicity of the amines is lowered to such a degree that the ammonium compound becomes unstable and hydrogen chloride or the chlorinated alkyl group is split off again. If the reaction is interrupted at this stage the chlorinated amines may be distilled off and thus separated. With aryl substituted amines it is possible to effect the nuclear chlorination by quaternization.

Examples of starting materials fulfilling the foregoing requirements are

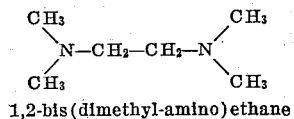
1,2-bis(dimethyl-amino)ethane

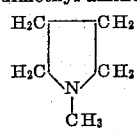
N-methylpyrrolidine

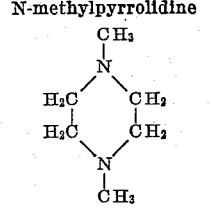
1,4-dimethylpiperazine

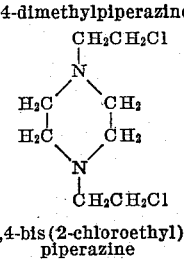
1,4-bis(2-chloroethyl) piperazine

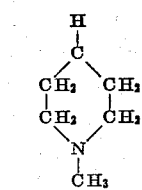
N-methylpiperidine

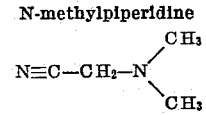
N,N-dimethylaminoacetonitrile

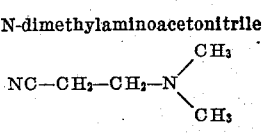
N,N-dimethylpropionitrile

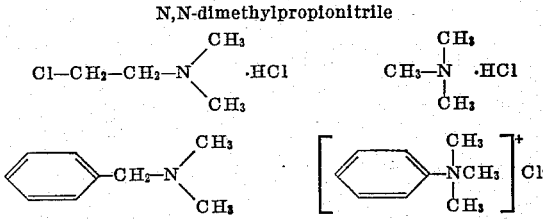

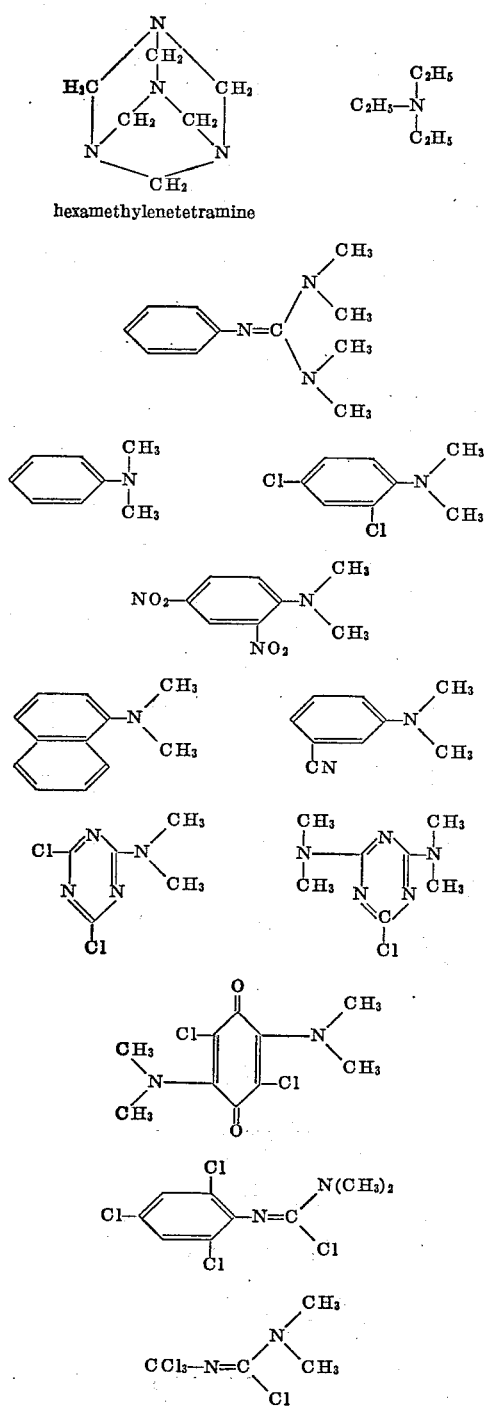

In addition to a substantial chlorination of the whole molecule there may be consequential reactions with which this invention is also concerned. Ring structures, for example, N-N'-dimethyl piperazine, are stabilized by a transformation to the aromatic state. Urotropin (hexamethylenetetramine) is split during chlorination in such a manner that cyanuric chloride is obtained as a reaction product. In the case of dimethylamino acetonitrile the cyano radical is split off and the molecule becomes dimeric.

Chlorination can also be carried out in a solvent, especially if ammonium salts with high melting points are used as starting materials. Suitable solvents are, for example, 1,2,4-trichlorobenzene, chloroform, tetrachloroethane and phthalyl chloride.

The invention is the more surprising in that direct chlorination of aliphatic or aliphatic-aromatic amines or of their salts have hitherto been described in few cases.

It is, for example, known that the addition product of chlorine and trimethyl amine sometimes dissociates explosively at 35° C. (see Houben-Weyl, Methoden der organischen Chemie, vol. V/3, page 642).

Some of the products obtainable according to the process of the present invention are known. The known compounds are, however, only obtainable with difficulty, by other methods. They are valuable products for the preparation of pest control agents, herbicides, dyestuffs and plastics. Further, they can as such be used as insecticides and nematocides, because of their high activity against spiders, mites, flies and fungi.

As a typical example of the high nematocidal activity of the products of the present invention the treatment of infested soil with 2,4,6-trichlorophenylimidocarbonyl chloride is shown below.

Soil is heavily infested with the root cyst nematode *Meloidogyne incognita*. 25, 50, 100 and 200 p.p.m. of 2,4,6-trichlorophenyl-imidocarbonyl chloride are added to one liter of infested soil. The active agent is applied in admixture with talcum, this mixture containing 1% of active ingredient.

One week after the preparation, seed of soft lettuce was put into the soil. After a 4 weeks period the plants were checked for cyst formation. The following table shows the effectiveness of the compound in preventing cyst formation.

|           | Percent |
|-----------|---------|
| 25 p.p.m. | 90      |
| 50 p.p.m. | 100     |
| 100 p.p.m.| 100     |
| 200 p.p.m.| 100     |

The following examples are given for the purpose of illustrating the present invention:

EXAMPLE 1

$$Cl_2C=N-CCl_2-CCl_2-N=CCl_2$$

116 parts by weight of 1,2-bis(dimethylamino)ethane are dissolved in 1000 parts by volume of 1,2,4-trichloro benzene. A weak current of chlorine is then introduced and the strongly exothermic reaction is restrained by cooling so that the temperature remains between 70–80° C. When the exothermic reaction has subsided, chlorination is continued while the mixture is irradiated with ultraviolet light, and the temperature rise is controlled in such a way that within one hour a rise of 10–15° C. takes place. Subsequently chlorination is continued for a further 3 hours at 200–230° C., then nitrogen is blown through and the solution left to cool. On cooling, most of the ethylene-1,2-bis-[imidocarbonyl chloride] precipitates as crystals, the remainder being obtained by further evaporating the solution.

Melting point (toluene) 166° C. (white flakes)

*Analysis.*—$C_4Cl_8N_2$: Found: C, 13.56%; N, 7.90%; Cl, 79.05%. Calculated: C, 13.3%; N, 7.8%; Cl, 79.0%.

Determination of molecular weight (after period in hexachloro-benzene)—Found: 365. Calculated: 360.

The same compound can be obtained by chlorinating dimethyl-amino-acetonitrile

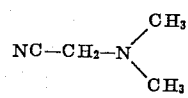

with dissociation of cyanogen chloride, by chlorinating under the same conditions as described hereinbefore in this example.

EXAMPLE 2

140 parts by weight of hexamethylene-tetramine are suspended in 600 cc. of tetrachloroethane and a gentle stream of chlorine is passed therethrough at room temperature, whereby the temperature quickly rises to 80–90° C. and the suspension changes to a thick paste. Subsequently the temperature is slowly raised to 135–140° C. (10 degrees per hour). Chlorination is continued while the mixture is irradiated with ultraviolet light until most of the substance has dissolved and there is only a small residue left. After filtering off the residue the tetrachloroethane is distilled off and the remaining yellow oil is further chlorinated at 200–240° C. During chlorination large quantities of a white substance of boiling point 190° C. and melting point 146° C. sublime in the condenser. The same substance is obtained by the subsequent distillation of the chlorination product. The substance was identified by analysis, mixed melting point and spectrum as cyanuric chloride.

EXAMPLE 3

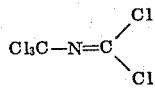

355 parts by weight (6 mols) of trimethylamine are dissolved in 1000 parts by volume of 1,2,4-trichlorobenzene while the solution is cooled with ice. Under continued cooling hydrogen chloride is introduced to saturation point. A pasty suspension of the hydrochloride in trichlorobenzene is obtained, into which chlorine is introduced at 140° C. for 20 hours while stirring and irradiating the mixture with ultraviolet light. The reaction product, a clear dark brown solution, is fractionated in vacuum through a silvered column. The solvent, boiling point 90–95° C. at 16 mm. Hg is separated from the other fractions, boiling point 60–90° C. at 16 mm. Hg and 95–210° C., and a mixture of chlorinated amines is thus obtained which is chlorinated for 4 hours at 170° C. and for 11 hours at 200° C. while the mixture is irradiated with ultraviolet light. The product is again fractionated in vacuum through a silvered column. The trichloromethylimidocarbonyl chloride distils over at boiling point 65–67° C. at 17 mm. Hg.

$n_D^{20}$: 1.5540

*Analysis.*—$C_2Cl_5N$ (molecular weight: 215.3—Calculated: C=11.16%; Cl=82.35%; N=6.51%. Found: C=11.58, 11.65%; Cl=82.1%; N=6.4%, 6.7%.

EXAMPLE 4

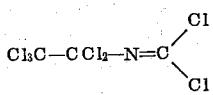

Chlorine is passed into a suspension of 576 grams (4 mols) of finely ground 1-dimethylamino-2-chloroethane hydrochloride in 700 cc. of 1,2,4-trichlorobenzene while stirring and irradiating the mixture with ultraviolet light. After about 40 hours at 130–140° C. the salt has dissolved with liberation of hydrogen chloride. The brown reaction liquid is further chlorinated for 3 hours at 160° C. and for 16 hours at 210° C. The chloroform liberated during the reaction may be separated with a conventional water trap. After removing hydrogen chloride and excess chlorine by means of nitrogen the reaction mixture is fractionated in vacuum over a silvered column. At boiling point 120–121° C. and 13 mm. Hg pentachloroethylimidocarbonyl chloride distils over as a colorless liquid.

$n_D^{20}$: 1.5530

*Analysis.*—$C_3Cl_7N$ (molecular weight: 298.24)—Calculated: C, 12.09%; Cl, 83.25%; N, 4.70%. Found: C, 12.61%; Cl 82.55%; N 5.05%.

EXAMPLE 5

Trichlorophenylimidocarbonyl chloride 400 grams (2.33 mols) of N-phenyl-N,N,N-trimethylammonium chloride are suspended in 700 cc. of 1,2,4-trichlorobenzene. The mixture is then chlorinated for 13 hours at 100° C. while stirring and irradiating it with an ultraviolet lamp. The ammonium salt dissolves and, with liberation of hydrogen chloride, a yellow and a dark brown liquid are obtained which remain separated in two phases. While continuing the introduction of chlorine the temperature is raised by 20° C. every two hours until 200° C. has been reached, when chlorination is continued for a further 7 hours at this temperature. The reaction mixture is fractionated in vacuum, the solvent is separated and the residue chlorinated again at 240° C. for 18 hours. The reaction product is then fractionated through a silvered column. The trichloro-phenylimidocarbonyl chloride distils over as a faintly yellow liquid with a boiling point of 148–153° C. at 15 mm. Hg.

$n_D^{20}$: 1.5950

*Analysis.*—$C_7H_2Cl_5N$ (molecular weight: 277.4)—Calculated: C, 30.32%; H, 0.73%; N 5.05%; Cl, 63.91%. Found: C, 30.04%, 30.36%; H, 0.76%, 0.89%; N, 5.23%, 5.25%; Cl, 64.4%, 64.5%.

EXAMPLE 6

2,3,5,6-tetrachloro-pyrazine from 1,4-dimethyl-piperazine

A solution of 80 grams (0.7 mol) of 1,4-dimethyl-piperazine in 150 cc. of chloroform is chlorinated, while cooled with ice, for 8 hours at 30° C. After the reaction, strongly exothermic at the beginning, has subsided, 200 cc. of 1,2,4-trichlorobenzene are added, the chloroform is distilled off and the suspension further chlorinated at higher temperatures, finally at 200° C. while it is irradiated with ultraviolet light. Distillation under vacuum yields at boiling point 100–145° C. and 15 mm. Hg a fraction from which 2,3,5,6-tetrachloropyrazine precipitates, on cooling, as colorless crystals. After recrystallization from methanol colorless flakes of melting point 97–99° C. are obtained.

*Analysis.*—$C_4Cl_4N_2$ (molecular weight: 217.9)—calculated: C, 22.05%; Cl, 65.09%. Found: C, 22.41%, 22.34%; Cl 64.7%, 65.0%.

EXAMPLE 7

2,3,5,6-tetrachloro-pyrazine from 1,4-bis(2-hydroxyethyl) piperazine 250 cc. of 1,2,4-trichlorobenzene are added to 87 grams (0.5 mol) of 1,4-bis(2-hydroxyethyl)piperazine while cooled with ice and the mixture is chlorinated for 6 hours at 25° C. under irradiation with ultraviolet light. It is then heated and chlorination continued while the temperature is slowly raised to 200° C. Subsequently the reaction mixture is fractionated in vacuum. At boiling point 100–140° C. 14 mm. Hg a fraction is obtained from which tetrachloropyrazine crystallizes on cooling. Recrystallization from acetonitrile or methanol yields colorless flakes of melting point 96–99° C.

*Analysis.*—$C_4Cl_4N_2$ (molecular weight 217.9)—calculated: C, 22.05%; N, 12.86%. Found: C, 22.40%, 22.42%; N, 12.65%, 12.66%.

EXAMPLE 8

Tetrachloropyridines and pentachloro-pyridine from N-methyl-piperidine

Chlorine is passed at 10° C. into a solution of 198 grams (2 mols) of N-methyl-piperidine in 200 cc. of chloroform while cooling with ice. A pasty suspension is obtained which is then chlorinated at 20° C., while the mixture is stirred and irradiated with ultraviolet light, until the solution becomes clear. The temperature is then slowly raised, the chloroform distilled off at 60° C., and while chlorine is passed under further irradiation with ultraviolet light the mixture is maintained for several hours each at 120° C., 140° C., 160° C., 180° C. and finally at 200° C. Subsequently nitrogen is blown through the mixture and it is fractionated in vacuum. At boiling point 109–125° C. at a pressure of 12 mm. Hg, 234 grams tetrachloropyridine distils over. A fraction of boiling point 125–140° C. at a pressure of 12 mm. Hg, yields when cooled a solid precipitate of 31 grams (=6.2% of the theoretical) of pentachloropyridine (from ethanol, colorless polyhedrons having a melting point of 125–127° C.) and a mother liquor containing 22 grams of tetrachloropyridine. The total yield of isomeric tetrachloropyridines amounts to 256 grams (59% of the theoretical).

*Analysis.*—$C_5Cl_5N$ (molecular weight: 251.4)—calculated: C, 23.89%; Cl, 70.52%; N, 5.57%. Found: C, 24.04%, 24.20%; Cl, 70.45%, 70.65%; N, 5.71%, 5.76%.

*Analysis.*—$C_5HCl_4N$ (molecular weight: 216.9): calculated: C, 27.69%; H, 0.47%; N, 6.46%. Found: C, 27.20%, 27.46%; H, 0.5%, 0.5%; N, 6.41%.

EXAMPLE 9

366 parts by weight of dimethyl-aniline are chlorinated, first without irradiation, at a temperature between 20–60° C. until the reaction stops being exothermic (chlorination of the nucleus). From a temperature of 60° C. onwards, the chlorination is then continued under ultraviolet irradiation. The temperature is raised in such a way that a temperature rise of about 10° C. per hour takes place. When the temperature has reached 190–220° C., chlorination is continued for a further 3 hours at this temperature. Nitrogen is then passed through in order to remove any dissolved chlorine.

During the subsequent vacuum-distillation trichlorophenylimidocarbonyl chloride distils over at a pressure of 0.3 mm. Hg at 88–91° C.

Yield: 648 parts by weight, $n_D^{20}=1.5970$

*Analysis.*—$C_7H_2NCl_5$—calculated: C, 30.15%; H, 0.72%; N, 5.06%; Cl, 64.2%. Found: C, 30.17%; H, 0.78%; N, 5.65%; Cl, 64.4%.

EXAMPLE 10

816 parts by weight of 2-dimethylamino-4,6-dichlorotriazine are melted at 125° C. and chlorine is introduced into the melt at a temperature of 130–150° C. After about 4 hours when the exothermic reaction has subsided, the chlorination is continued under ultraviolet irradiation and the temperature raised by 10° C. per hour until it reaches 220° C. At this temperature chlorine is introduced, while the mixture is irradiated, for about 8 hours. The product is then fractionated under a waterjet vacuum. After first runnings consisting of trichloromethylimidocabonyl chloride and cyanuric chloride the compound of the formula

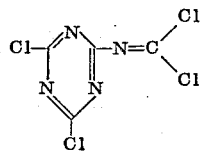

distils over at a boiling point of 126–128° C./12 mm. Hg.

Yield: 672 parts by weight, $n_D^{20}:1.5751$

*Analysis.*—$C_4N_4Cl_4$—calculated: C, 19.5%; N, 22.8%; Cl, 57.6%. Found: C, 19.62%; N, 22.87%; Cl, 56.97%.

The products are identical with the so-called "tetrameric cyanogen chloride" which is formed in small quantities in the trimerization of cyanogen chloride into cyanuric chloride.

EXAMPLE 11

110 parts by weight of 2,4-bis(dimethylamino)-6-chlorotriazine-1,3,5 are chlorinated as described in Example 10. Upon fractionating, there are obtained, after first runnings of cyanuric chloride and trichloromethylimidocarbonyl chloride, 59 parts by weight of the compound

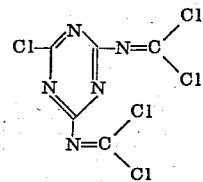

B.P. 106–112° C./0.07 mm. Hg; $n_D^{20}:1.5854$

*Analysis.*—$C_5N_5Cl_5$—calculated: C, 19.6%; N, 22.8%; Cl, 57.9%. Found: C, 19.94%; N, 22.57%; Cl, 58.45%.

EXAMPLE 12

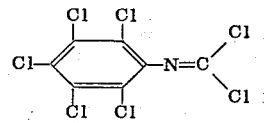

A mixture of 385 parts by weight of N,N-dimethylpentachloro-aniline and 250 parts by volume of chloroform is chlorinated at 40–55° C. while irradiating it with ultraviolet light, the mixture being cooled with ice-water because of the strongly exothermic reaction. The temperature of the reaction mixture is then slowly raised, as described in Example 9, during which period the chloroform distils off, and finally the mixture is kept for 8 hours at 200–230° C. Excess chlorine is then removed by blowing through nitrogen and pentachlorophenylimidocarbonyl chloride having the foregoing formula is distilled off under high vacuum. It boils at a pressure of 0.1 mm. Hg at 134–138° C. and has a refractive index $n_D^{20}=1.6258$.

*Analysis.*—$C_7Cl_7N$—calculated: C, 24.3%; N, 4.05%; Cl, 70.6%. Found: C, 24.4%; N, 4.5%; Cl, 71.5%.

EXAMPLE 13

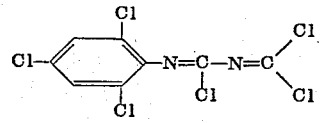

232 grams of a compound having the formula

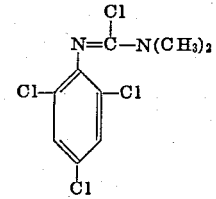

that was obtained by condensation of trichlorophenylimidocarbonyl chloride (Example 5) and dimethyl-amine [B.P. 128–131° C./0.09 mm. Hg] are chlorinated as described in Example 12. Excess chlorine is then removed by blowing through nitrogen and the reaction product distilled off under a high vacuum. Boiling point 138–142° C. at 0.1 mm. Hg; $n_D^{20}=1.6080$.

*Analysis.*—$C_8H_2Cl_6N_2$—calculated: C, 28.3%; H, 0.59%; N, 8.25%; Cl, 63.0%. Found: C, 28.47%; H, 0.65%; N, 8.22%; Cl, 63.55%.

EXAMPLE 14

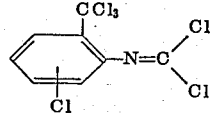

A mixture of 366 parts by weight of 2-N,N-dimethylamino toluene and 300 parts by volume of chloroform is chlorinated as described in Example 12 and worked up.

The reaction product boils at a pressure of 0.05 mm. Hg at 130–136° C.; $n_D^{20}=1.6107$.

*Analysis.*—$C_8H_3Cl_6N$—calculated: C, 29.4%; H, 0.92%; N, 4.3%; Cl, 65.4%. Found: C, 28.96%; H, 0.91%; N, 4.28%; Cl, 65.45%.

EXAMPLE 15

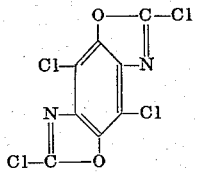

240 parts by weight of 2,5-dimethylamino-3,6-dichloro-p-benzoquinone and 1500 parts by volume of trichlorobenzene are chlorinated at room temperature under ultraviolet irradiation. Without external supply of heat the temperature of the mixture rises to 80° C. After the exothermic reaction has subsided the mixture is further chlorinated as described in Example 9. The solvent is finally distilled off and a product having the foregoing formula is obtained in the form of pale yellow crystals having a melting point of 264–266° C. (after recrystallization from xylene), besides a red oil of unknown constitution.

*Analysis.*—$C_8Cl_4N_2O_2$—calculated: C, 32.2%; N, 9.4%; Cl. 47.6%; O, 10.7%. Found: C, 32,7%; N, 9.3%; Cl, 46.7%; O, 11.5%.

Hydrolyzable chlorine: Calculated: 23.8%. Found: 23.5%.

EXAMPLE 16

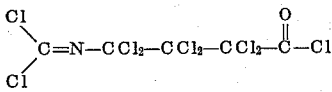

To 397 parts by weight of N-methyl-pyrrolidone are added 500 parts by weight of 1,2,4-trichlorobenzene; the mixture is chlorinated at 110° C. while the mixture is stirred and irradiated with ultraviolet light. After 16 hours the temperature is raised by 20° C. every 3 hours while chlorine is continually introduced and then the mixture kept at 220–230° C. for 20 hours. Hydrogen chloride and excess chlorine are then driven out with nitrogen and the reaction mixture is subjected to fractional distillation in a silver-lined column. 3-chloroformylhexachloropropylimidocarbonyl chloride distils over at a pressure of 15 mm. Hg at 188–189° C. and forms a crystalline solid in the receiver. By recrystallization from acetonitrile the product is obtained in the form of colorless polyhedrons having a melting point of 98–101° C.

*Analysis.*—Molecular weight 409.2. Calculated for $C_5Cl_9NO$: C, 14.68%; Cl, 77.99%; N, 3.42%; O, 3.91%. Found: C, 14.84%, 14.86%; Cl, 77.75%, 77.90%; N, 3.63%, 3.63%; O, 4.11%, 4.31%.

We claim:

1. A process for the production of an organic compound containing chlorine and nitrogen combined in the —N=CCl— radical which comprises:
   (A) reacting an amino compound selected from the group consisting of (i) amines of the formula

wherein
   $R_1$ stands for lower alkyl,
   $R_2$ stands for lower alkyl,
   $R_3$ stands for a radical selected from the group consisting of lower alkyl, chloro-substituted lower alkyl, cyano-substituted lower alkyl, phenyl-substituted lower alkyl, phenyl, chlorophenyl, cyano-phenyl, nitro-phenyl, naphthyl, benzoquinonyl, chloro-substituted triazinyl, chloro and amino-substituted triazinyl,

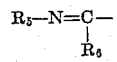

wherein $R_5$ is a member selected from the group consisting of chloro-phenyl, lower chloro alkyl and phenyl, and $R_6$ stands for a member selected from the group consisting of chloro and amino, and

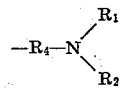

wherein $R_4$ is lower alkyl and $R_1$ and $R_2$ are separately lower alkyl and when taken together with the nitrogen to which they are attached, a 5 to 6 membered heterocyclic group containing nitrogen as the only heterocyclic atom,
   (ii) salts of said amines with hydrogen halides, and
   (iii) quaternary salts of said amines with alkyl halides, with chlorine while it is irradiated with ultraviolet light at a temperature below 140° C. for such a period that replaceable hydrogen atoms and the amino compound are replaced by chlorine atoms,
   (B) further treating the reaction mixture containing the chlorine-containing compound with additional chlorine at a higher temperature between 140° C. and 300° C. while it is irradiated with ultraviolet light, and
   (C) recovering the resulting organic compound containing nitrogen and chlorine combined in an —N=CCl— radical.

2. A process for the production of an organic nitrogen compound containing chlorine and nitrogen combined in the —N=CCl— radical which comprises
   (A) reacting a compound selected from the group consisting of (i) amines of the formula

in which $R_1$ and $R_2$ stand for alkyl and in which $R_3$ stands for a member selected from the group consisting of alkyl and aryl radicals and their halogen, cyano, aryl, alkyl, amino and imino derivatives, (ii) salts of said amines with hydrogen halides and (iii) quaternary salts of said amines with hydrogen halides with chlorine at temperatures below 140° C. until all replaceable hydrogen atoms are replaced by chloro-atoms.
   (B) treating the chlorination product thus obtained with chlorine at temperatures between 140° and 300° C., whereby alkyl chloride is split off, and
   (C) recovering the organic nitrogen compound from the reaction mixture.

3. A process for the production of ethylene-1,2-bis-[imidocarbonyl chloride] which comprises reacting 1,2-bis(dimethylamino)ethane in solution in 1,2,4-trichlorobenzene with chlorine at a temperature between 70 and 80° C. while it is irradiated with ultraviolet light, continuing the reaction with chlorine at a temperature gradually increasing to 200° C. and thereafter at a temperature between 200 and 230° C., and subsequently recovering the ethylene-1,2-bis[imidocarbonyl chloride] thus produced.

4. A process for the production of trichloromethylimidocarbonyl chloride which comprises reacting a suspension of trimethylamine hydrochloride in 1,2,4-trichlorobenzene with chlorine at a temperature of approximately 140° C. while it is irradiated with ultraviolet light, distilling off the 1,2,4-trichlorobenzene and reacting the resulting mixture of chlorinated amines with chlorine at a temperature between 170 and 200° C. and subsequently recovering the trichloromethylimidocarbonyl chloride.

5. A process for the production of pentachloroethylimidocarbonyl chloride which comprises reacting a suspension of 1-dimethylamino-2-chloroethane hydrochloride in 1,2,4-trichlorobenzene with chlorine at a temperature between approximately 130 and 140° C. while it is irradiated with ultraviolet light, continuing the reaction with chlorine at a temperature between 160 and 210° C., and subsequently recovering the pentachloroethylimidocarbonyl chloride.

6. A process for the production of trichlorophenylimidocarbonyl chloride which comprises reacting a suspension of N-phenyl-N,N,N-trimethylammonium chloride in 1,2,4-trichlorobenzene with chlorine at a temperature of approximately 100° C. while it is irradiated with ultraviolet light, continuing the reaction with chlorine while the temperature is gradually increased to and held at 200° C., distilling off the 1,2,4-trichlorobenzene, further reacting the resulting residue with chlorine at a temperature of approximately 240° C., and subsequently recovering the trichlorophenylimidocarbonyl chloride.

7. A process for the production of trichlorophenylimidocarbonyl chloride which comprises reacting N,N-dimethylaniline with chlorine at a temperature gradually increasing from 60 to 220° C. while it is irradiated with ultraviolet light and subsequently recovering the trichlorophenylimidocarbonyl chloride thus produced.

8. A process for the production of pentachlorophenylimidocarbonyl chloride which comprises reacting N,N-dimethylpentachloroaniline in chloroform with chlorine at a temperature between 40 and 55° C. while it is irradiated with ultraviolet light, distilling off the chloroform and continuing the reaction of the residue with chlorine at temperatures gradually increasing to between 200 and 230° C., and subsequently recovering the pentachlorophenylimidocarbonyl chloride.

References Cited by the Examiner

Hackh's Chemical Dictionary, second edition, 1937, pub. by P. Blackiston's Son & Co., p. 501.

Houben-Weyl: "Methoden Der Organischen Chemie," vol. V/3, pp. 640–642 and 916–920, May 1962.

Stedman's Medical Dictionary, seventeenth revised edition, 1949, pub. by Williams & Wilkins Co., p. 613.

JOHN D. RANDOLPH, *Acting Primary Examiner.*

DUVAL T. McCUTCHEN, NICHOLAS S. RIZZO, WALTER A. MODANCE, *Examiners.*